April 12, 1938. W. C. SWIFT 2,113,667
METHOD OF COATING FERROUS MATERIALS WITH A COPPER RICH ALLOY
Filed Oct. 18, 1934

INVENTOR
Willis C. Swift
BY
Wooster & Davis
ATTORNEYS.

Patented Apr. 12, 1938

2,113,667

UNITED STATES PATENT OFFICE 2,113,667

METHOD OF COATING FERROUS MATERIALS WITH A COPPER-RICH ALLOY

Willis C. Swift, West Alexandria, Ohio, assignor to The American Brass Company, Waterbury, Conn., a corporation of Connecticut Application October 18, 1934, Serial No. 748,847

4 Claims. (Cl. 219—10)

This invention relates to an improved method of welding or applying a coating of one metal to another, and more particularly of applying a coating of an alloy rich in copper to ferrous materials, and has for an object to provide a method by which a coating, such for example as an alloy rich in copper, may be applied to ferrous materials such for example as iron, steel, and the like, including high carbon steels, without injuring the ferrous materials or base metal.

It is common practice at the present time to weld additional metal to another or base metal by striking an electric arc from a rod of the weld metal to the base metal and melting the metal of the rod to deposit it on the base metal. In this method of welding the work can proceed only as rapidly as the current carrying capacity of the welding electrode itself permits, and furthermore as the arc is struck directly onto the base metal such materials as high carbon steels would be injured with microscopic cracks. The same is true if you strike an arc from a carbon electrode directly on to the high carbon steel.

I have overcome this difficulty and have effectively coated various ferrous materials including high carbon steels with an alloy rich in copper by striking the arc with a carbon electrode from the coating metal itself, as for example a welding or filler rod in contact with the ferrous materials and melting a portion of the weld rod to form a pool of melted coating metal on the steel or ferrous material and heating the steel or ferrous material through this pool by playing the arc on this pool only. This protects the steel or base metal from the direct heat of the arc so that it is not cracked or injured, and when the steel or other ferrous base metal has reached the proper temperature the molten metal runs from the pool along the surface of the ferrous material and bonds to and covers it. The operator can follow along with the arc and continue to melt in more coating metal from the weld rod and thus continue to heat more of the surface of the ferrous or base metal to the bonding temperature and cover as much of the surface of this material with the copper alloy as desired. My invention is also adapted for renewing a copper alloy coating upon a ferrous metal that has been previously coated, that is, it may be used to renew the coating upon itself where the first coating has been worn away.

Referring to the accompanying drawing in which one way of carrying out this method is illustrated.

A member to be coated is indicated at 10 such for example as steel or other ferrous materials, and this is on the positive side of the arc as by any suitable connection such for example as a U-shaped clamp 11 secured to the element by a set screw 12 and connected to the positive lead 13 from a suitable source of electric current. A carbon electrode 14 is the negative electrode.

Figure 1:
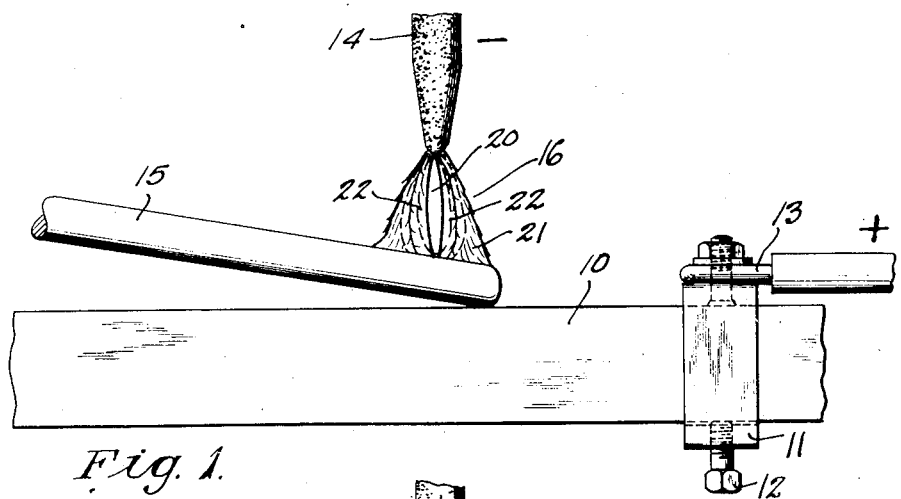
Fig. 1 is a side elevation showing the initial step of the method.
Figure 2:
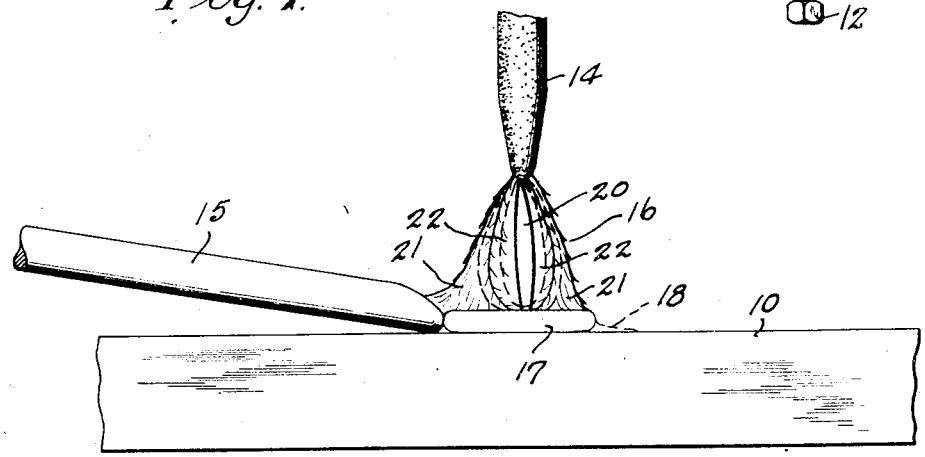
Fig. 2 is a similar view showing the second step of the method.
Figures 3, 4:
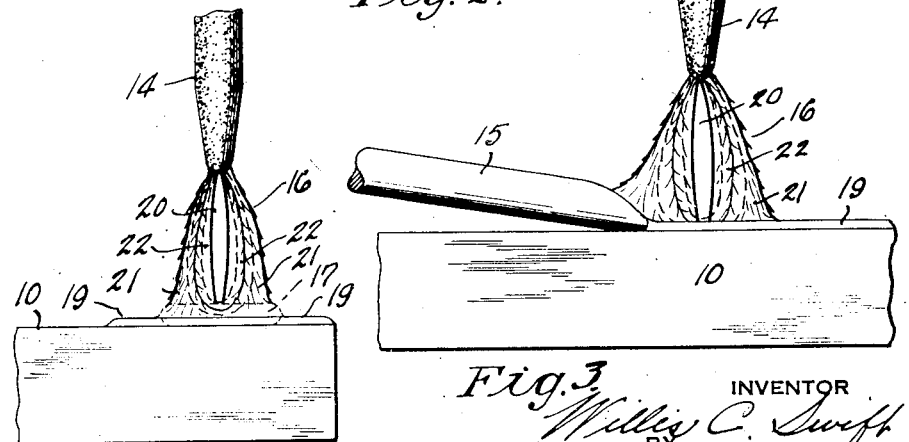
Fig. 3 is a view similar to Figs. 1 and 2 illustrating the completion of the operation.
Fig. 4 is a view looking from the left of Fig. 3 with the weld rod omitted.

The coating metal to be applied to the surface of the member 10 is ordinarily in the form of a welding or filler rod a portion of which is indicated at 15, and is ordinarily an alloy rich in copper so as to produce a coating of this material on the surface of the ferrous member 10. In carrying out my improved method the welding or filler rod 15 is placed in contact with the member 10 and then an arc is struck between this rod and the carbon electrode 14 as indicated at 16. It is to be noted this arc is not struck between the carbon electrode and the base metal 10, but is between the carbon electrode and the welding rod 15 so that the metal 10 is protected from the direct heat of the arc. This arc melts a portion of the coating metal 15 forming a pool 17 of melted coating metal on the surface of the base metal 10 as shown diagrammatically in Fig. 2. The arc is played on this pool of melted coating metal by which heat is transferred to the base metal 10. When the base metal has reached a sufficient temperature to unite or bond with the coating metal melted coating metal flows from the pool over the surface of the base metal and bonds to it as indicated diagrammatically at 18, forming a coating 19 of the coating metal thoroughly bonded to the surface of the base metal. The operator can continue to melt more coating metal from the rod 15 into the pool and at the same time can move the arc forwardly, or from side to side if a wide deposit is required, at all times playing the arc only on the molten coating metal and filler rod and never directly on the base metal, and can cover as much surface of the base metal as is desired.

It will thus be seen that according to this improved method the work is done by what is known as the carbon arc process in which the base metal is always on the positive side. Before beginning the coating operation it is desirable that the surfaces to be coated should be free from oil or grease, but excellent results in coating steel are secured without going to the trouble of having the oxide removed. It is important to note that in arc welding, the metal or electrode on the positive side receives approximately twice the heat as the electrode on the negative side of the arc.

It will be evident from the foregoing that as in this method the arc is not struck or played directly on the base metal this metal is protected from the direct heat of the arc, and as the arc is played on the pool of melted coating metal the heat passes through this coating metal into the base metal and is conducted by the base metal beyond the limits of the pool. As soon as the temperature of the base metal reaches the bonding temperature, the melted metal immediately spreads and surface alloys or "tins" with the base metal. The arc is then moved forward, or from side to side if a wide deposit is desired, at all times playing only on the molten coating metal and never directly on the base metal, so as to protect the base metal. For example in the case of high carbon steel the intense sharply localized heat of the arc if played directly on this metal would cause an expansion and strain in the hard steel producing microscopic or minute cracks which would ruin it.

It is of course also important that the arc should not be played on any one spot of the coating metal for too great a length of time, as it might overheat this metal and also overheat the base metal below and cause an undesirable condition between the base metal and the coating metal.

As suggested above in the old operation of coating a base metal by the metal arc process, the work can proceed only as rapidly as the current carrying capacity of the electrode itself permits. Also, injury may be caused by the direct arc on the base metal; but with the carbon arc of the present process very large high current capacity carbons can be used and with coating metal which is not easily overheated the work can proceed very rapidly. For example, in the application of this process in the building of a boss around the pin carrying the side rods on a locomotive drive wheel the work was done by this process in about fifteen minutes where heretofore in building such bosses by the oxyacetylene process the necessary preheating and welding took one day's time.

This method can be used for depositing copper rich alloys on ferrous materials for a large number of different purposes. An important use is where it is desirable to add a coating of improved bearing metal to ferrous materials, such for example as locomotive hub liners, cross head shoes or guides, undersides of pistons, and other wearing surfaces more or less difficult to lubricate.

I am not limited in this method to any particular length of arc. On heavy jobs with large masses of base metal and/or more heavy coatings of the copper alloy I prefer to use the long arc method of my prior Patent Number 1,986,303, but on lighter work where one may advance rapidly along the weld a shorter arc can be used. The long arc of the copending application gives a much wider blanket of carbon dioxide and nitrogen than the short arc so keeps the oxygen in the air from getting to the melted copper. Furthermore, with the long arc for a given current value there is more heat generated than in a short arc. This, however, does not mean that the metal is more highly heated as the arc is spread over a greater area and therefore heats and is absorbed by a greater area. This permits the operator to carry the arc straight along the joint and he does not have to weave it back and forth in a way which might cause exposure of the melted metal to the air. This longer arc may be from ½ to 1½ inches in length and preferably from approximately ¾ to 1¼ inches, and is generated with an arc voltage of from 30 to 65 volts.

This long arc is composed of several zones. The arc core is shown at 20 and represents a zone rich in volatilized carbon. The arc flame indicated at 21 is a zone rich in carbon dioxide and it will therefore be seen that the part of the arc in contact with the work as well as the outside envelope of the arc is largely carbon dioxide, while the carbon monoxide zone 22 or a zone rich in carbon monoxide is largely within the arc itself and not in as intimate contact with the work as would be the case were the carbon held to give a short arc. These zones are not clearly defined and no one constituent is found solely in one zone. Probably all three constituents are to some extent in each of the three zones, and between zones 21 and 22 there is a zone rich in both carbon dioxide and carbon monoxide, but with the long arc, with a given heat liberation, the atmosphere against the molten metal is much richer in carbon dioxide and poorer in carbon monoxide than the arc atmosphere of a short arc in which the heat liberation is identical. Therefore the long arc is an advantage in the melting of copper or copper rich alloys as there is less absorption of carbon monoxide by the molten copper which would be later separated out as the copper alloy solidifies to make it porous, carbon dioxide not being soluble to any extent in molten copper. Also, the long arc spreads out much more than the short arc so that the heat is not so concentrated and there is less danger of overheating the metal.

Various alloys rich in copper may be used as the coating metal, but it should be capable of conducting sufficient heat to bring the base metal to such temperature that the coating metal will bond to it, without overheating of the coating metal. If used in a bearing it should obviously have good bearing qualities and resistance to wear. A coating metal of high tin content, such as a phosphor-bronze welding rod composed principally of copper and containing tin and phosphorus, makes a very good coating metal as it bonds well with the ferrous materials and has excellent resistance to wear. These rods may be of an alloy of from approximately 1 percent to 15 percent tin, phosphorus 0.01 percent to 2 percent, with the remainder copper. The preferred range of tin is approximately 5 to 12 percent. A specific alloy found to be very satisfactory is approximately 89.5 percent copper, 10.5 percent tin and phosphorus 0.2 percent to 0.50 percent. Also, similar rods with the same amount of phosphorus, with approximately 5 percent tin, also 8 percent tin, and 10 percent tin. The tin makes the alloy more fluid and lowers its melting temperature, while the alloy boils at a high temperature and so can stand more heat. These are all desirable properties in bonding and coating and produce better results. This alloy has about the right amount of phosphorus so that the metal is thoroughly deoxidized at all times while being fused. If the tin is as high as 15 percent the rod will not be workable as it will be brittle and is liable to break. It is also difficult to roll or draw, but rods up to this content of tin can be cast. Alloys with less tin can be rolled and worked.

A rod of copper deoxidized with silicon can be used, and also this rod dipped in molten tin. A rod of an alloy of approximately 96 percent copper, 3 percent silicon and 1 percent manganese was satisfactory for certain purposes.

I can also secure satisfactory results with a number of other alloys depending upon the use to which the finished article is to be put. Thus I can also use silicon-bronze, and copper-silicon alloys containing modifying elements, such as manganese, tin, etc. I can use copper-silicon alloys with up to 6 percent silicon, or copper alloys carrying 6 percent or less of silicon and one or more modifying elements. For example, a very good alloy is a copper-silicon-manganese alloy containing from 0.1 percent to 6 percent silicon, from 0.01 to 3 percent manganese, and with the balance copper. Also, a copper-silicon-zinc alloy containing 6 percent or less silicon, not more than 5 percent zinc, and balance copper can be used.

In ordinary welding whether oxyacetylene, carbon arc, or metallic arc the general procedure is to first heat the surface of the base metal to receive the weld metal to a temperature corresponding to that at which the weld metal melts, and the weld metal is supplied from the hot end of a filler rod so that in this case the base metal is not heated by playing the arc on a pool of weld metal as the work proceeds. It is quite common to feed weld metal into a pool of molten metal but the heating of the base metal is done ahead of the depositing of the weld metal. Important advantages of my new process where the base metal is heated entirely by playing the arc on the melted coating metal are that it makes possible a very high rate of coating which thereby reduces the cost very greatly, and also the protection given the ferrous materials that might be cracked by receiving at some one spot the intense heat of the arc and therefore will deposit the coating without cracking such materials as high carbon steel. The method, however, is not limited to use on high carbon steels, and can be used on all ferrous materials, as machine steel, carbon steel, cast iron, malleable iron, and ferrous alloys in general.

Having thus set forth the nature of my invention, what I claim is:

1. A method of applying a coating of an alloy rich in copper to a ferrous base metal comprising striking an arc from approximately one-half to one and one half inches in length between a carbon electrode and the alloy with the carbon as the negative electrode, melting the alloy by said arc into a pool of molten metal in contact with the surface of the ferrous base metal, and heating the surface of the base metal to a sufficient temperature to bond with the alloy by playing this arc on the pool of melted alloy only.

2. A method of coating ferrous base metals with an alloy rich in copper comprising striking an arc of from approximately one-half to one and one half inches in length between a carbon electrode and a member composed of this alloy and with the carbon as the negative electrode, melting alloy from said member by said arc into a pool of molten metal in contact with the surface of the ferrous base metal, heating the surface of the base metal to a sufficient temperature to bond with the alloy by playing the arc on the pool of melted alloy only, and melting additional of the alloy metal from said member by the arc into the already melted metal to cover additional surface of the ferrous metal.

3. A method of coating a ferrous base metal with an alloy rich in copper comprising placing a filler rod of the alloy in contact with the surface of the ferrous metal, striking an arc between a carbon electrode and the rod of from approximately one-half to one and one-half inches in length and with the carbon as the negative electrode, melting a portion of said rod by said arc into a pool of molten metal onto the surface of the ferrous metal, playing the arc on the pool of molten metal only to heat the base metal to a sufficient temperature to bond with the alloy, and melting more of the alloy metal from the rod by the arc into the melted metal and heating additional surface of the ferrous metal by the arc through the melted metal only.

4. A method of applying a coating of an alloy rich in copper to a ferrous base metal comprising striking an arc of from approximately three quarters to one and one quarter inches in length between a carbon electrode and said alloy and with the carbon as the negative electrode, and heating the surface of the ferrous base metal by the arc through the pool of melted alloy only and to a sufficient temperature to bond with the alloy.

WILLIS C. SWIFT.